United States Patent [19]
Yada et al.

[11] Patent Number: 5,222,336
[45] Date of Patent: Jun. 29, 1993

[54] MOLDING FOR USE WITH AN AUTOMOBILE

[75] Inventors: Yukihiko Yada, Nagoya; Keiichi Fukushima, Toyota; Kazuo Kitamura, Kariya, all of Japan

[73] Assignee: Tokai Kogyo Kabushiki Kaisha, Obu, Japan

[21] Appl. No.: 749,963

[22] Filed: Aug. 26, 1991

[30] Foreign Application Priority Data

Aug. 28, 1990 [JP] Japan .................................. 2-227599

[51] Int. Cl.$^5$ ............................................. B62D 27/06
[52] U.S. Cl. ...................................... 52/208; 52/397; 52/400; 296/93
[58] Field of Search .................... 296/93, 146 M, 208; 52/208 OR, 397, 400g330401

[56] References Cited

U.S. PATENT DOCUMENTS 4,332,412  6/1982  Nakazawa et al. .................... 296/93

FOREIGN PATENT DOCUMENTS 0078919   3/1989  Japan ..................................... 296/93
1-223018  9/1989  Japan .
2219338  12/1989 United Kingdom .................. 296/93

Primary Examiner—Carl D. Friedman
Assistant Examiner—Wynn E. Wood
Attorney, Agent, or Firm—Dennison, Meserole, Pollack & Scheiner

[57] ABSTRACT

A molding includes a molding body and a weir member. The weir member is longitudinary fitted along the molding body corresponding to a front pillar of the automobile body and to an arcuate body portion interconnecting the front pillar and a roof panel of the automobile body. The molding body and weir member have a pin and a pin insertion hole so that the weir member is retained on a desired position on the molding body when the molding is installed to the automobile body.

9 Claims, 8 Drawing Sheets

MOLDING FOR USE WITH AN AUTOMOBILE

BACKGROUND OF THE INVENTION

The present invention relates to a molding for use with an automobile, and more particularly, the invention relates to a molding which comprises a molding body and a weir member partly provided on the molding body.

FIGS. 16 to 18 show a conventional molding 310 for use with an automobile. The molding 310 generally comprises a molding body 311 and a pair of weir members 321. The molding body 311 has a leg portion 312 to be installed into a clearance between a circumferential edge of a windshield 305 and an automobile body 301, and a covering portion 341 which comprises an outer covering portion 314 contactable with the automobile body 301 and an inner covering portion 313 contactable with the windshield 305. Each of the weir members 321 is provided on the lower surface of the inner covering portion 313 of the molding body 311 so as to extend along each of front pillars 303 of the automobile body 1.

As shown in FIGS. 17 and 18, the molding 310 is installed in the clearance between the circumferential edge of the windshield 305 and the automobile body 301. At the molding body 311 adjacent to a roof panel 302 of the automobile body 301, the inner covering portion 313 is closely seated on the outside surface of the windshield 305 (FIG. 17). At the molding body 311 adjacent to the front pillar 303, the weir member 321 is closely seated on the outside surface of the windshield 305, thereby to form a guide groove 322 between the outside surface of the windshield 305 and the inner covering portion 313 (FIG. 18). The guide groove 322 may act as a leading groove to lead rainwater or the like therealong and to prevent flowing of the rainwater over the molding body 311 toward a front door glass.

A problem usually associated with the prior art molding is that as best shown in FIG. 16, the weir member 321 is arranged along the front pillar 303 but not arranged along an arcuate portion c of the automobile body 301 which interconnects the roof panel 2 and the front pillar 3. Therefore, the guide groove 322 is not formed along the arcuate portion c. This may lead to flow of a part of rainwater over the molding body 311 adjacent to the arcuate portion c toward the front door glass.

Another problem usually associated with the prior art molding 310 is that the weir member 321 is supported on the molding body 311 only by fitting into a groove G formed between the inner covering portion 313 and a lip member 315. This may lead to sliding motion of the weir member 321, thereby causing difficulty of accurate positioning of the weir member 321 on the molding body 311 when the molding 310 is installed to the automobile body 301.

The other prior art molding for use with an automobile are found, for example, in Japanese Laid-Open Patent Publication No. 1-223018.

SUMMARY OF THE INVENTION

It is an object of the invention to provide an improved molding for use with an automobile which may perfectly prevent flowing of the rainwater over the molding body toward a front door glass.

It is another object of the invention to provide an improved molding for use with an automobile in which the weir member may be accurately positioned on the molding body when the molding is installed to the automobile body.

A molding of the present invention includes a molding body having a leg portion extending along a circumferential edge of the windshield and a covering portion integrally provided along an upper side of the leg portion, and a weir member having a weir portion and a fitting portion. The fitting portion of the weir member is integrally formed with the weir portion and is adapted to be fitted to the leg portion of the molding body. The weir member is longitudinary fitted along the molding body corresponding to a front pillar of the automobile body and to an arcuate body portion interconnecting the front pillar and a roof panel of the automobile body. The molding body and weir member have a pin and a pin insertion hole so that the weir member is kept on a desired position on the molding body when the molding is installed to the automobile body.

An important feature of the present invention is that the weir member is positioned along the arcuate portion of the automobile body so that the guide groove is extended into the arcuate portion, thereby offering the advantage that the rainwater is effectively interrupted by the guide groove so as not to flow over the molding body toward the front door glass.

Another feature of the present invention is that the positioning pin is used so as to permit only limited sliding motion of the weir member during installation of the molding to the automobile body, thereby offering the advantage that the weir member may be accurately set on the desired position on the molding body when the molding is installed on the automobile body.

The present invention will become more fully apparent from the claims and the description as it proceeds in connection with the drawings.

DETAILED DESCRIPTION OF THE PREFERRED EMBODIMENT

Figure 4:
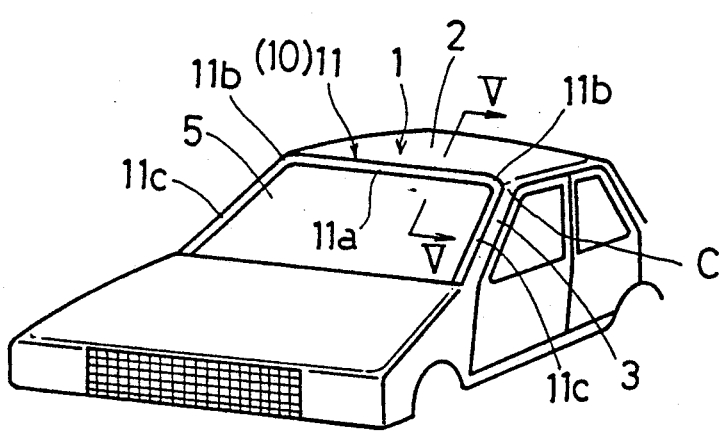
FIG. 4 is a schematic illustration of an automobile showing several portions mounted with a molding according to the first embodiment of the present invention.

Referring to FIG. 4, a front windshield 5 is provided on a body 1 of an automobile. The windshield 5 is effectively supported on a roof panel 2 of the automobile body 1 and on front pillars 3 integrally formed with the roof panel 2. A molding 10 is installed in a clearance between the edge surface of the windshield 5 and the automobile body 1.

Referring now to FIGS. 1 to 3 and 5 to 7, shown therein is a molding 10 according to a first embodiment of the invention.

Figure 1:
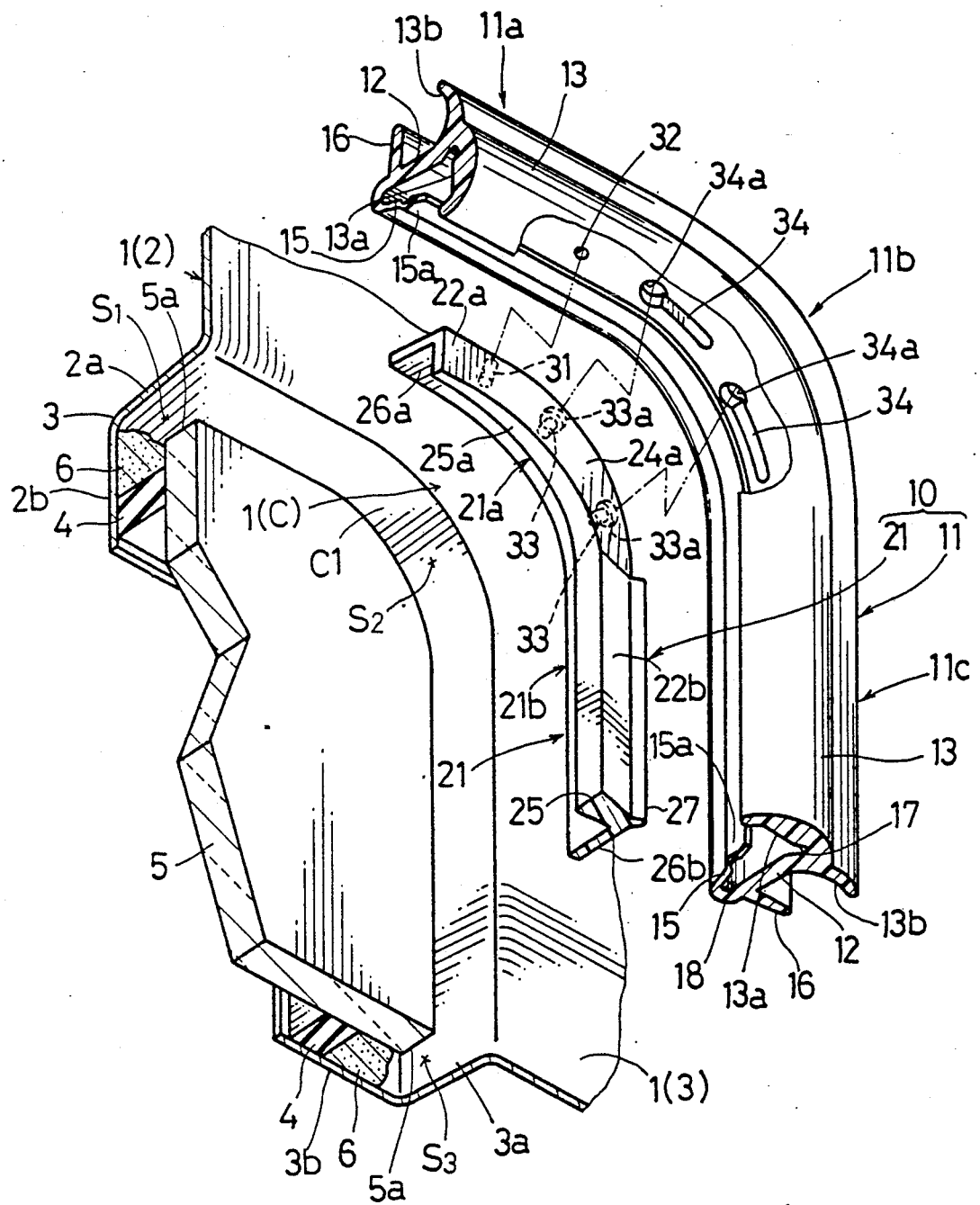
FIG. 1 is a perspective view of a molding body and a weir member according to a first embodiment of the present invention prior to installation in the clearance between the circumferential edge of the windshield and the automobile body.
Figure 6:
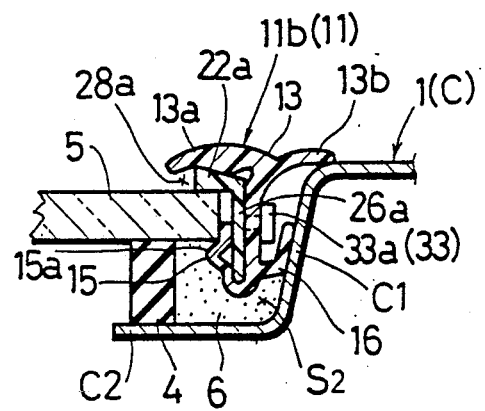
FIG. 6 is a sectional view taken along the line VI—VI of FIG. 5.

As shown in FIG. 1, the roof panel 2 and the front pillars 3 are interconnected to form arcuate portions C therebetween. The peripheral edge of the roof panel 2 is inwardly folded to form a slanted wall portion 2a and a flanged portion 2b. The peripheral edge of each of the arcuate portions C is inwardly folded to form a slanted arcuate wall portion C1 and a flanged portion C2 (FIG. 6). The peripheral edge of each front pillar 3 is also inwardly folded to form a slanted wall portion 3a and a flanged portion 3b. As will be easily understood, the wall portions 2a, C1, 3a and flanged portions 2b, C2, 3b are integrally connected with each other. The windshield 5 is circumferentially provided with a dam member 4 formed of rubber or the like and is bonded to the flanged portions 2b, C2, 3b with adhesive 6.

As shown in FIG. 1, the molding 10 comprises a molding body 11 which is formed of resilient material such as rubber and synthetic resin and has a substantially uniform cross-sectional configuration throughout the overall length thereof, and a weir member 21 which is integrally formed of hard or semi-hard synthetic resin.

The molding body 11 includes a first molding section 11a which is to be positioned along the roof panel 2, second molding sections 11b which are to be positioned along the arcuate portion C and third molding sections 11c which are to be positioned along the front pillars 3. Each of these sections 11a, 11b, 11c of the molding body 11 has a substantially T-shaped cross-sectional configuration and comprises a leg portion 12 which is to be inserted into clearances S1, S2, S3 between the wall portions 2a, C1, 3a and an edge surface 5a of the windshield 5, and a covering portion 13 which is integrally formed with the leg portion 12 and which is sized to sufficiently cover the clearance S1, S2, S3. The covering portion 13 includes an outer covering portion 13b to contact the roof panel 2, the arcuate portions C and the front pillars 3, and an inner covering portion 13a to contact the outer surface of the windshield 5. The inner covering portion 13a is formed with a thin groove 17 along the base end thereof. The leg portion 12 is integrally formed with an engagement lip 15 which is inwardly projected and which extends over the entire length of the leg portion 12, thereby to form an engagement groove 18 therebetween. The engagement lip 15 has a shoulder portion 15a engageable with the lower edge of the windshield 5. The leg portion 12 is also integrally formed with a resilient lip 16 which is outwardly projected and which extends over the entire length of the leg portion 12.

Figure 3:
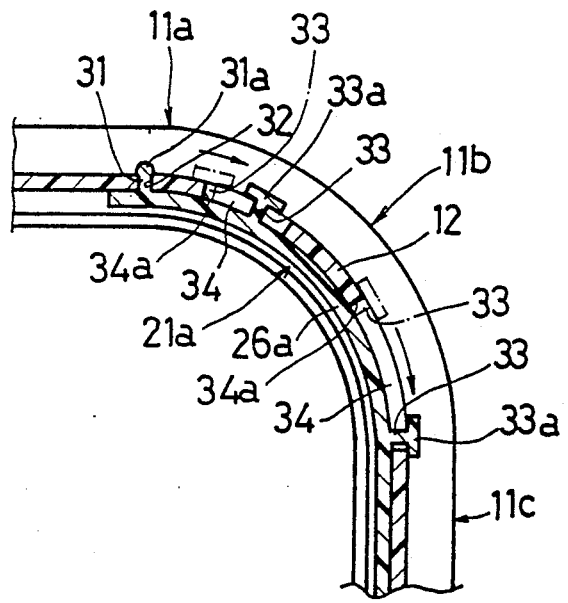
FIG. 3 is a fragmentary sectional view of the molding.

As shown in FIGS. 1 and 3, the leg portion 12 of the second molding section 11b has a through hole 32 and two enlarged through holes 34a each of which has a narrow elongated slot 34 extending toward the third molding section 11c.

Figure 2:
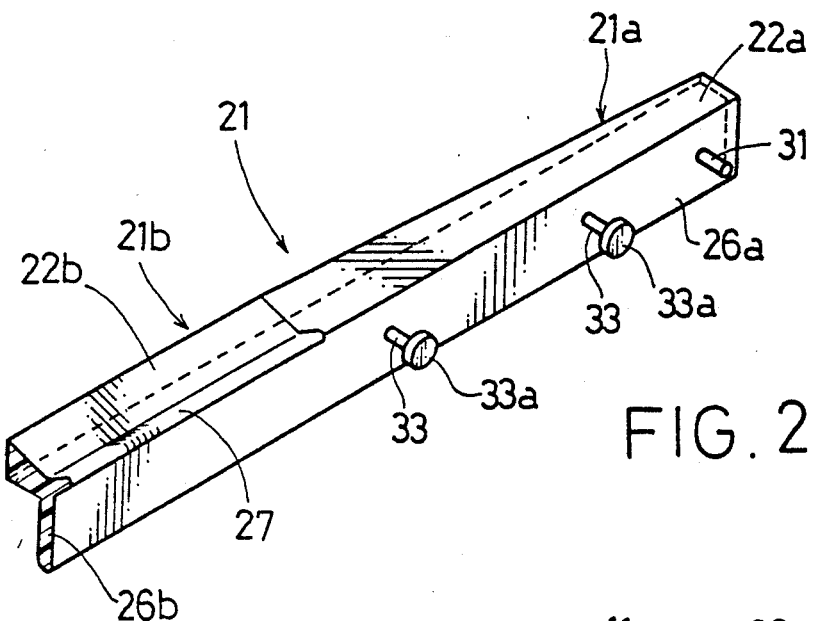
FIG. 2 is a perspective view of the weir member.

As shown in FIGS. 1 to 3, the weir member 21 has a first weir section 21a which is to be arranged along the second molding section 11b, and a second weir section 21b which is to be arranged along the third molding section 11c and which is integrally formed with the first weir section 21a. The first weir section 21a comprises a first weir portion 22a and a first leg portion 26a. The second weir section 21b comprises a second weir portion 22b continuing to the first weir portion 22a, a second leg portion 26b continuing to the first leg portion 26a, and a lip portion 27 integrally formed with the second weir portion 22b. As shown therein, the thickness of the first weir portion 22a is gradually reduced toward the distal end thereof.

As best shown in FIG. 2, a positioning pin 31 is integrally mounted on the first leg portion 26a of the first weir section 21a. The pin 31 is positioned near the distal end of the first leg portion 26a and is sized to be closely insertable into the through hole 32. The first leg portion 26a also has two engagement pins 33 each of which has a diameter substantially equal to the width of the elongated slot 34. Each of the engagement pins 33 has an enlarged head 33a having a diameter which is smaller than that of the through hole 34a but greater than the width of the elongated slot 34.

The weir member 21 is assembled to the molding body 11 by inserting the first and second leg portions 26a, 26b and the lip portion 27 into the engagement groove 18 and the thin groove 17 of the molding body 11, respectively, so that the first and second weir sections 21a, 21b are juxtaposed with the second and third molding sections 11b, 11c. At this time, the positioning pin 31 and the engagement pins 33 are inserted into the through holes 32, 34a, respectively. As best shown in FIG. 3, the free end of the pin 31 inserted into the through hole 32 is heated to form a crimped portion 31a, thereby to prevent slipping off of the weir member 21 from the molding body 11. It is to be understood that the weir member 21 and the molding body 11 are previously straightened before they are combined with each other.

As shown in FIGS. 3 and 5 to 7, the molding 10 as assembled above is installed to the automobile body 1 by inserting the leg portion 12 of the molding body 11 into the clearance S1, S2, S3 between the edge surface 5a of the windshield 5 and the automobile body 1. When the molding 10 is installed to the automobile body 1, both of the second molding section 11b and the first weir section 21a are bent so as to conform to the arcuate configuration of the arcuate portion C. As shown in FIG. 3, the curvature of the second molding section 11b, however, is greater than that of the first weir section 21a when the molding 10 is bent. Therefore, each of the engagement pins 33 is moved relative to the second molding section 11b and is disengaged from the through hole 34a for engagement with the elongated slot 34. As described above, since the diameter of the head 33a of each of the engagement pins 33 is greater than the width of the elongated slot 34, each of the engaging pins 33 is retained in the slot 34, thereby to reliably prevent slipping off of the weir member 21.

Figure 5:
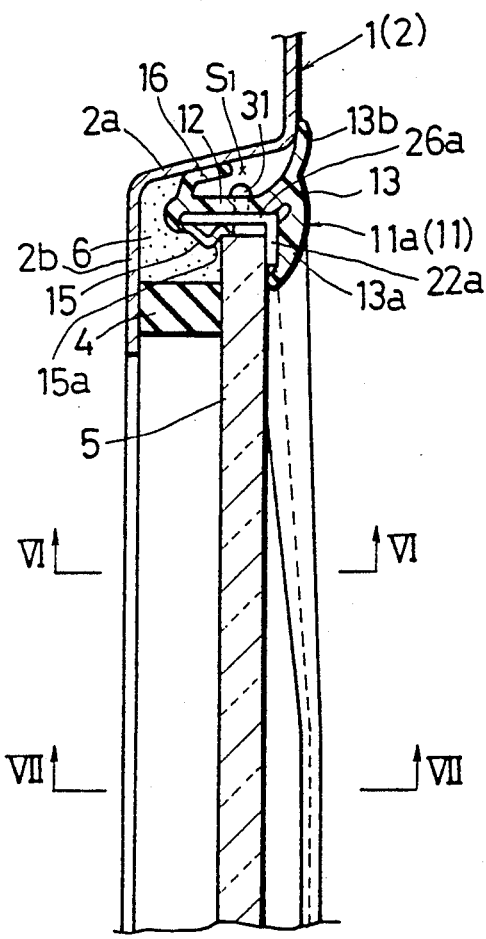
FIG. 5 is a sectional view taken along the line V—V of FIG. 4.

As shown in FIG. 5, at the first section 11a of the molding body 11, the inner covering portion 13a and the outer covering portion 13b are closely seated on the outside surface of the windshield 5 and the outside surface of the roof panel 2, respectively. The shoulder portion 15a of the engagement lip 15 is engaged with the inside edge of the windshield 5. The resilient lip 16 is biased to the wall portion 2a of the roof panel 2. Thus, the first section 11a of the molding body 11 is stably supported between the roof panel 2 and the windshield 5. The first section 11a is finally secured to the flanged portion 2b with the adhesive 6.

As shown in FIG. 6, at the second section 11b of the molding body 11, the first weir portion 22a is closely seated on the outside surface of the windshield 5, thereby to form a guide groove 28a between inner covering portion 13a and the windshield 5. The outer covering portion 13b is closely seated on the outside surface of the arcuate portion C of the automobile body 1. The shoulder portion 15a of the engagement lip 15 is engaged with the inside edge of the windshield 5. The resilient lip 16 is biased to the wall portion C1 of the arcuate portion C. Thus, the second section 11b of the molding body 11 is stably supported between the arcuate portion C and the windshield 5. The second section 11b is finally secured to a flanged portion C2 with the adhesive 6.

Figure 7:
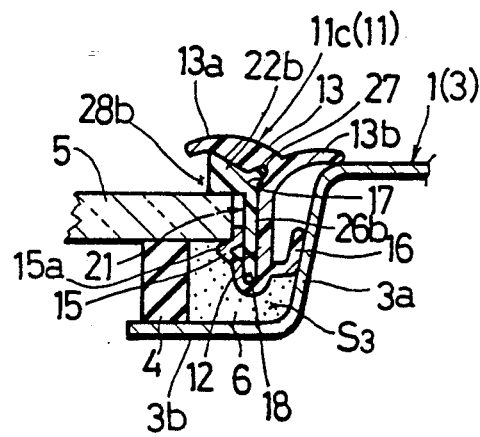
FIG. 7 is a sectional view taken along the line VII—VII of FIG. 5.

As shown in FIG. 7, at the third section 11c of the molding body 11, the second weir portion 22b is closely seated on the outside surface of the windshield 5, thereby to form a guide groove 28b continuing to the guide groove 28a between inner covering portion 13a and the windshield 5. The outer covering portion 13b is closely seated on the outside surface of the front pillar 3. The shoulder portion 15a of the engagement lip 15 is engaged with the inside edge of the windshield 5. The resilient lip 16 is biased to the wall portion 3a of the front pillar. Thus, the third section 11c of the molding body 11 is stably supported between the front pillar 3 and the windshield 5. The third section 11c is finally secured to a flanged portion 3b with the adhesive 6.

Referring now to FIGS. 8 to 12, shown therein is a molding according to a second embodiment of the invention. As with the first embodiment, the molding 110 is installed in a clearance between the edge surface of the windshield 5 and the automobile body 1.

Figure 8:
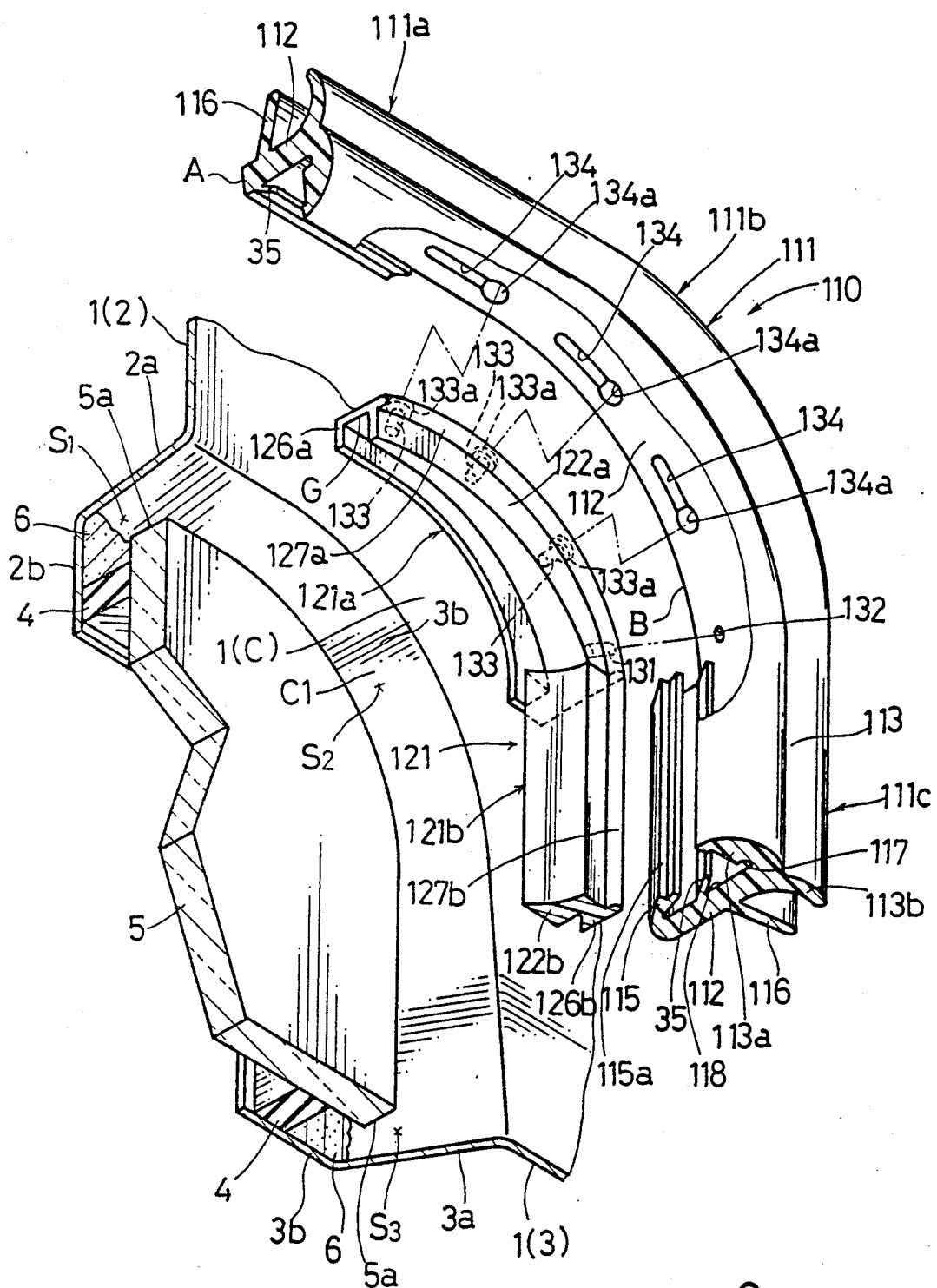
FIG. 8 is a view similar to FIG. 1, showing a molding body and a weir member according to a second embodiment of the present invention.

As shown in FIG. 8, the molding 110 comprises a molding body 111 which is formed of resilient material such as rubber and synthetic resin, and a weir member 121 which is integrally formed of hard or semi-hard synthetic resin.

The molding body 111 includes a first molding section 111a which is to be positioned along the roof panel 2, second molding sections 111b which are to be positioned along the arcuate portions C, and third molding sections which are to be positioned along the front pillars 3. Each of these sections 111a, 111b, 111c of the molding body 111 has a substantially T-shaped cross sectional configuration and comprises a leg portion 112 which is to be inserted into clearances S1, S2, S3 between the wall portions 2a, C1, 3a and the edge surface 5a of the windshield 5, and a covering portion 113 which is integrally formed with the leg portion 112 and which is sized to sufficiently cover the clearance S1, S2, S3. The covering portion 113 includes an outer covering portion 113b to contact the roof panel 2, the arcuate portions C and the front pillars 3, and an inner covering portion 113a to contact the outer surface of the windshield 5. The inner covering portion 113a is formed with a thin groove 117 along the base end thereof. The leg portion 112 is integrally formed with engagement lips 35, 115 which are inwardly projected. The engagement lip 35 cooperates with the leg portion 112 to form an engagement groove 118 therebetween. The engagement lip 115 has a shoulder portion 115a engageable with the lower edge of the windshield 5. The leg portion 112 is also integrally formed with a resilient lip 116 which is outwardly projected and extends over the entire length of the leg portion 112.

As shown in FIG. 8, the leg portion 112 of the first and second molding sections 111a, 111b is partly removed along first and second removing surfaces A, B, respectively. As shown therein, the engagement lip 115 is removed at the leg portion 112 of the first and second molding sections 111a, 111b but the engagement lip 35 is removed only at the leg portion 112 of the second molding section 111b. Further, the resilient lip 116 is not removed at the leg portion 112 of the first and second molding sections 111a, 111b at all.

As shown in FIG. 8, the leg portion 112 of the second molding section 111b has a through hole 132 and three enlarged through holes 134a each of which has a narrow elongated slot 134 extending toward the first molding section 111a.

Figure 9:
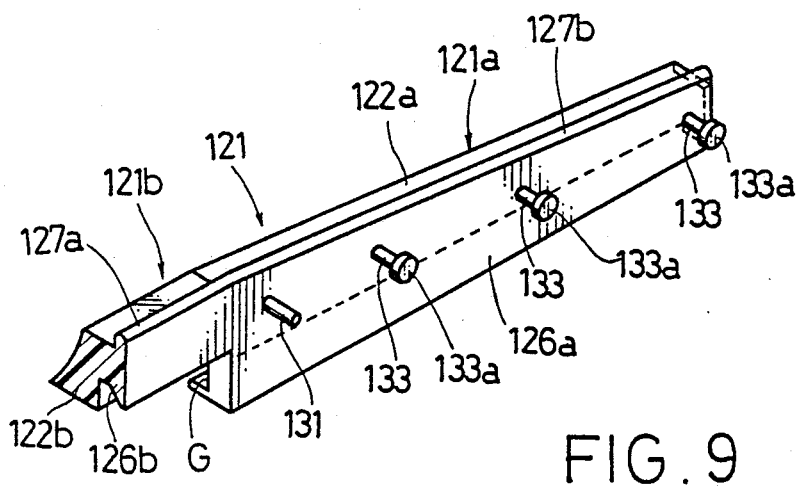
FIG. 9 is a perspective view of the weir member.

As shown in FIGS. 8 and 9, the weir member 121 has a first weir section 121a which is to be arranged along the second molding section 111b, and a second weir section 121b which is to be arranged along the third molding section 111c and which is integrally formed with the first weir section 121a. The first weir section 121a comprises a first weir portion 122a, and a first leg portion 126a which has an L-shaped cross-sectional configuration, and a first lip portion 127a integrally formed with the first weir portion 122a. The second weir section 121b comprises a second weir portion 122b continuing to the first weir portion 122a, a second leg portion 126b continuing to the first leg portion 126a, and a second lip portion 127b continuing to the first lip portion 127a. As shown therein, the thickness of the first weir portion 122a is gradually reduced toward the distal end thereof. Also, first leg portion 126a cooperates with the first weir portion 122a to form a groove G therebetween which may receive the edge portion of the windshield 5.

As best shown in FIG. 9, a positioning pin 131 is integrally mounted on the first leg portion 126a of the first weir section 121a. The pin 131 is positioned near the proximal end thereof and is sized to be closely insertable into the through hole 132. The first leg portion 126a also has three engagement pins 133 each of which has a diameter substantially equal to the width of the elongated slot 134. Each of the engagement pins 133 has an enlarged head 133a having a diameter which is smaller than that of the through hole 134a but greater than the width of the elongated slot 134.

The weir member 121 is assembled to the molding body 111 by inserting the second leg portions 126b into the engagement groove 118 and by inserting the first and second lip portion 127a, 127b into the thin groove 117, so that the first and second weir sections 121a, 121b are juxtaposed with the second and third molding sections 111b, 111c. At this time, the positioning pin 131 and the engagement pins 133 are inserted into the through holes 132, 134a, respectively. It is to be understood that the weir member 121 and the molding body 111 are previously straightened before they are combined with each other.

Figure 10:
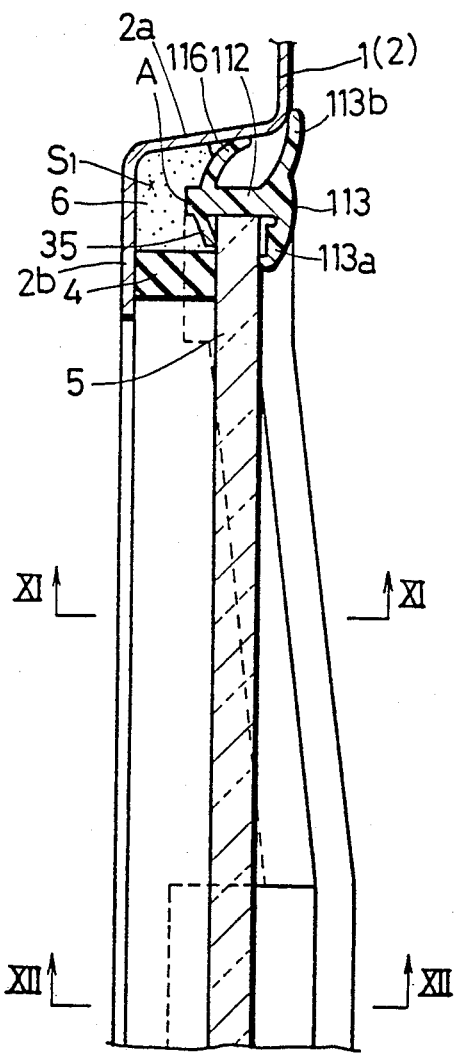
FIG. 10 is a vertical sectional view of the molding installed in the clearance between the circumferentical edge of the windshield and the automobile body.
Figure 11:
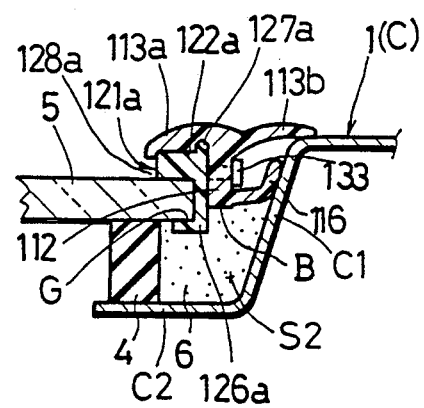
FIG. 11 is a sectional view taken along the line XI—XI of FIG. 10.
Figure 12:
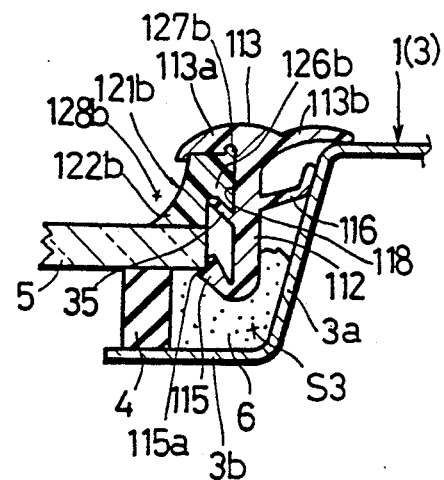
FIG. 12 is a sectional view taken along the line XII—XII of FIG. 10.

As shown in FIGS. 10 to 12, the molding 110 as assembled above is installed to the automobile body 1 by inserting the leg portion 112 of the molding body 111 into the clearances S1, S2, S3 between the edge surface 5a of the windshield 5 and the automobile body 1. When the molding 110 is installed to the automobile body 1, both of the second molding section 111b and the first weir section 121a are bent so as to conform to the arcuate configuration of the arcuate portion C. The curvature of the second molding section 111b, however, is greater than that of the first weir section 121a when the molding 110 is bent. Therefore, each of the engagement pins 133 is moved relative to the second molding section 111b and is disengaged from the through hole 134a for engagement with the elongated slot 134. As described above, since the diameter of the head 133a of each of the engagement pins 133 is greater than the width of the elongated slot 134, each of the engaging pins 131 is retained in the slot 134, thereby to reliably prevent slipping off of the weir member 121.

As shown in FIG. 10, at the first section 111a of the molding body 111, the inner covering portion 113a and the outer covering portion 113b are closely seated on the outside surface of the windshield 5 and the outside surface of the roof panel 2, respectively. The engagement lip 35 is engaged with the inside edge of the windshield 5. The resilient lip 116 is biased to the wall portion 2a of the roof panel 2. Thus, the first section 111a of the molding body 111 is stably supported between the roof panel 2 and the windshield 5. The first section 111a is finally secured to the flanged portion 2b with the adhesive 6.

As shown in FIG. 11, at the second section 111b of the molding body 111, the first weir portion 122a is closely seated on the outside surface of the windshield 5, thereby to form a guide groove 128a between inner covering portion 113a and the windshield 5. The outer covering portion 113b is closely seated on the outside surface of the arcuate portion C of the automobile body I. The guide groove G receives the inside edge of the windshield 5. The resilient lip 116 is biased to the wall portion C1 of the arcuate portion C. Thus, the second section 111b of the molding body 111 is stably supported between the arcuate portion C and the windshield 5. The second section 111b is finally secured to a flanged portion C2 with the adhesive 6.

As shown in FIG. 12, at the third section 111c of the molding body 111, the second weir portion 122b is closely seated on the outside surface of the windshield 5, thereby to form a second guide groove 128b between the inner covering portion 113a and the windshield 5. As will be easily understood, the second guide groove 128b continues to the first guide groove 128a. The outer covering portion 113b is closely seated on the outside surface of the front pillar 3. The shoulder portion 115a of the engagement lip 115 is engaged with the inside edge of the windshield 5. The resilient lip 116 is biased to the wall portion 3a of the front pillar. Thus, the third section 111c of the molding body 111 is stably supported between the front pillar 3 and the windshield 5. The third section 111c is finally secured to a flanged portion 3b with the adhesive 6.

Figure 13:
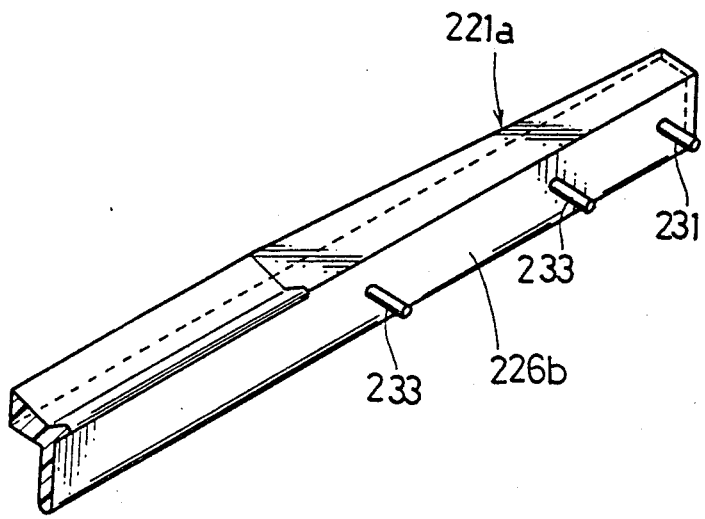
FIG. 13 is a perspective view of a weir member according to a third embodiment of the present invention.
Figure 14:
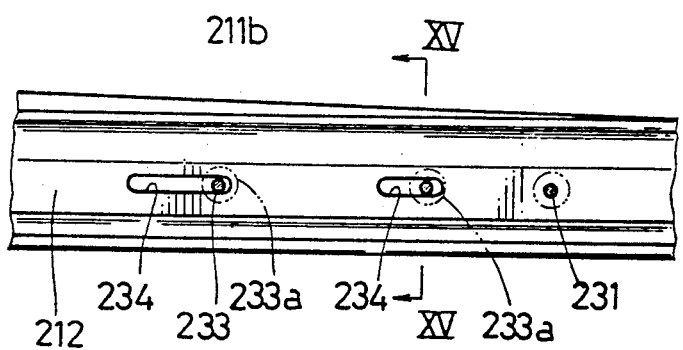
FIG. 14 is a fragmentary side view of a molding.
Figure 15:
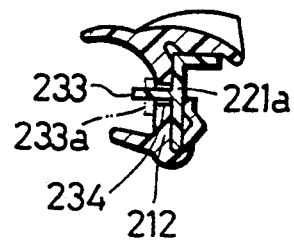
FIG. 15 is a sectional view taken along the line XV—XV of FIG. 14.
Figure 16:
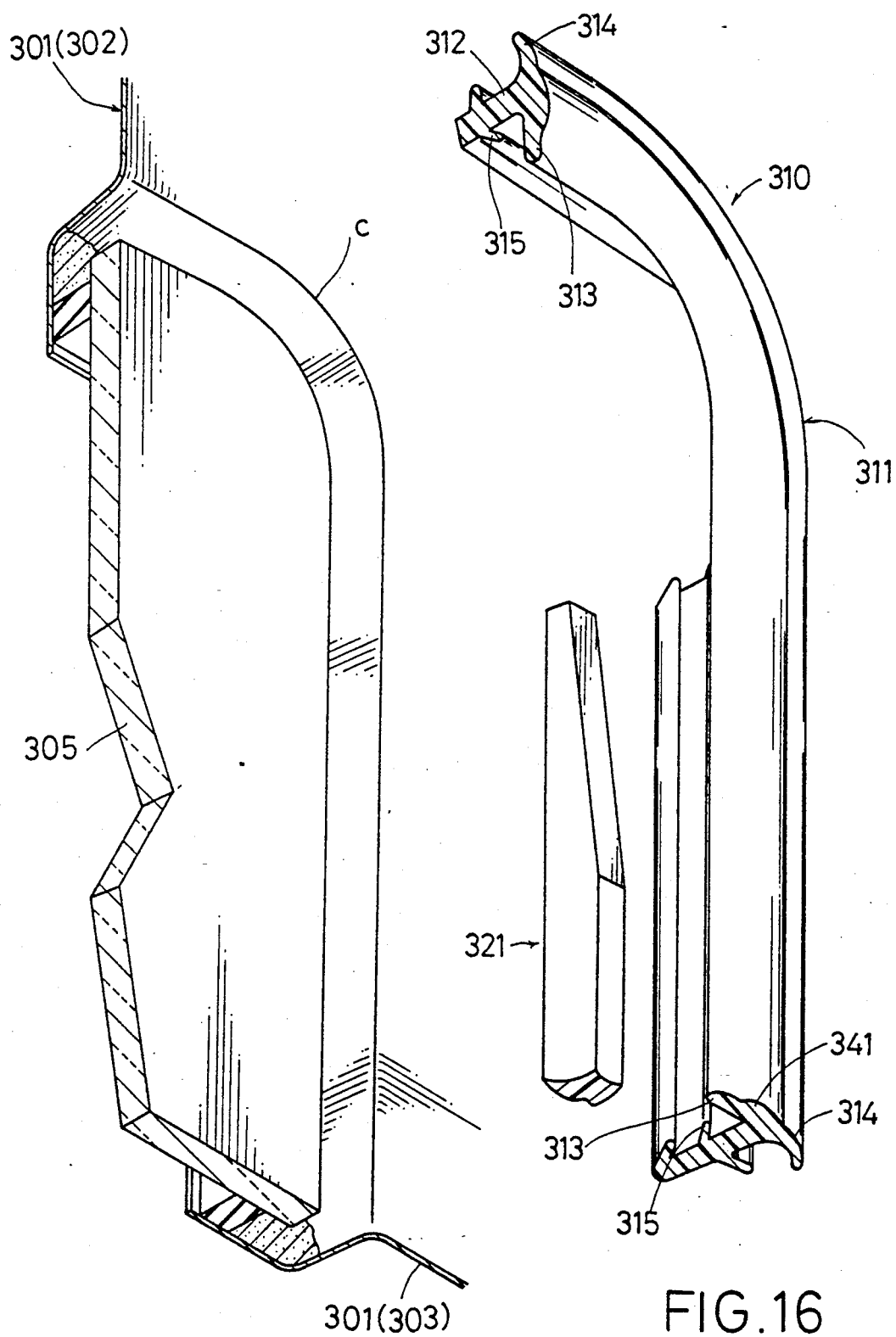
FIG. 16 is a view similar to FIG. 1, showing a conventional molding
Figure 17:
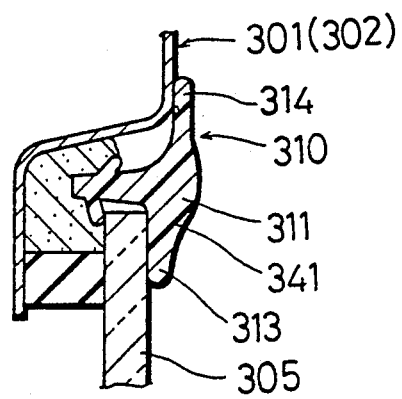
FIG. 17 is a view similar to FIG. 6, showing a conventional molding.
Figure 18:
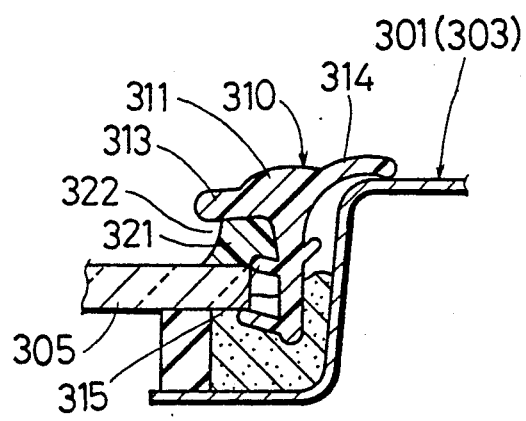
FIG. 18 is a view similar to FIG. 7, showing a conventional molding.

A further embodiment modified from the first and second embodiments will now be described with reference to FIGS. 13 to 15, wherein only parts different from those shown in FIGS. 1 to 3 and 5 to 12 will be explained.

A leg portion 212 of a second molding section 211b of a molding body has narrow elongated slots 234. A first leg portion 226a of a first weir portion 221a has engagement pins 233 each having a configuration similar to a positioning pin 231 and having a diameter substantially equal to that of the elongated slot 234. Each of the pins 233 is heated to form an enlarged head portion 233a at the free end thereof after insertion into the slot 234.

Further, in the above described embodiments, the pins and through holes may be provided on the molding body the weir member, respectively.

According to the present invention, the guide groove is extended to the arcuate portion interconnecting the roof panel and the front pillar, thereby to effectively lead rainwater and the like therealong and to prevent flowing of the rainwater toward a front door glass. Also, in the present invention, an engagement mechanism between pins and through holes is used, thereby permitting accurate positioning of the weir member on the molding body.

The preferred embodiments herein described are intended to be illustrative of the invention and not to limit the invention to the precise form herein described. They are chosen and described to explain the principles of the invention and their application and practical use to enable others skilled in the art to practice the invention.

We claim:

1. A molding for use with an automobile body to seal a clearance between the automobile body and a windshield mounted on the automobile body, comprising:

a molding body having a leg portion extending along a circumferential edge of the windshield and a covering portion integrally provided along an upper side of said leg portion;

a weir member having a weir portion and a fitting portion, said fitting portion being integrally formed with said weir portion and being adapted to be fitted to said leg portion of said molding body;

said weir member being longitudinally fitted along said molding body corresponding to a front pillar of the automobile body and to an arcuate body portion interconnecting the front pillar and a roof panel of the automobile body;

a positioning pin and a positioning pin insertion hole provided on said weir member and said molding body, said positioning pin insertion hole receiving said positioning pin for retention of said weir member at a desired position on said molding body when said molding is installed to the automobile body; and headed engagement pins and slots provided on said weir member and said molding body, said slots slidably receiving said headed engagement pins so that said headed engagement pins move along said slots when said molding body and said weir member are bent for installing said molding to the automobile body along the arcuate body portion interconnecting the front pillar and the roof panel.

2. The molding as defined in claim 1, wherein said leg portion of said molding body has an engagement groove extending therealong, and wherein said fitting portion of said weir member is fitted to said engagement groove, so that said weir member is mounted on said molding body.

3. The molding as defined in claim 2, wherein said weir portion of said weir member fitted along said molding body corresponding to said arcuate body portion interconnecting the front pillar and roof panel has a thickness gradually reduced toward one end thereof.

4. The molding as defined in claim 3, wherein said molding body and said weir member have said positioning pin insertion hole and said positioning pin, respectively.

5. The molding as defined in claim 3 or 4, wherein said molding body and said weir member have said slots and said headed engagement pins, respectively.

6. The molding as defined in claim 3 wherein said thickness of said weir portion is gradually reduced toward the roof panel.

7. The molding of claim 1 wherein said slots are of a size to preclude lateral withdrawal of said headed engagement pins therefrom for retention and adjustment of said weir member to said molding body as said molding body and weir member are bent for installation along the arcuate body portion.

8. The molding as defined in claim 7, wherein said slots have headed pin insertion holes of which the diameters are greater than those of the heads of said headed engagement pins so that said headed engagement pins are received in said slots when said weir member is fitted along said molding body.

9. The molding as defined in claim 7, wherein said headed engagement pins are formed from headless pins by enlarging the free ends thereof.

* * * * *